US007002806B2

(12) United States Patent  (10) Patent No.: US 7,002,806 B2
Hsu et al.  (45) Date of Patent: Feb. 21, 2006

(54) DRAWER-TYPE COMPUTER CASING

(75) Inventors: Hsin-An Hsu, Taipei (TW); Che-Fu Yeh, Taipei (TW)

(73) Assignee: First International Computer, Inc., Taipei (TW)

( * ) Notice: Subject to any disclaimer, the term of this patent is extended or adjusted under 35 U.S.C. 154(b) by 15 days.

(21) Appl. No.: 10/760,373

(22) Filed: Jan. 21, 2004

(65) Prior Publication Data

US 2005/0157473 A1    Jul. 21, 2005

(51) Int. Cl.
*H05K 7/16*    (2006.01)

(52) U.S. Cl. .................. 361/724; 361/695; 312/332.1; 454/184

(58) Field of Classification Search ........ 361/608–610, 361/614, 705, 683–687, 690, 695, 707; 312/301, 312/309, 310, 332.1; 454/184
See application file for complete search history.

(56) References Cited

U.S. PATENT DOCUMENTS

| | | | | |
|---|---|---|---|---|
| 5,947,572 A | * | 9/1999 | Chang | 312/332.1 |
| 6,025,989 A | * | 2/2000 | Ayd et al. | 361/695 |
| 6,246,576 B1 | * | 6/2001 | Sands et al. | 361/686 |
| 6,826,055 B1 | * | 11/2004 | Mease et al. | 361/725 |

* cited by examiner

*Primary Examiner*—Hung Van Duong
(74) *Attorney, Agent, or Firm*—Bacon & Thomas PLLC

(57) ABSTRACT

The present invention is to provide a drawer-type computer casing comprising a box and a sliding frame, wherein the box comprises an opening on one side, a connecting section disposed respectively on both corresponding sides of the opening and an accommodating space therein, and the sliding frame can be accommodated in the accommodating space and comprises a latching member movably coupled to an end surface of the box at the position corresponding to the connecting section, such that when the sliding frame is installed in the accommodating space, the latching member will be set precisely on the corresponding position of the connecting section. Therefore, the latching member can be moved into the connecting section to connect the box and the sliding frame together without using screws.

7 Claims, 4 Drawing Sheets

DRAWER-TYPE COMPUTER CASING

BACKGROUND OF THE INVENTION

I. Field of the Invention

This invention relates to a computer casing, more particularly to a drawer-type computer casing comprising a box and a sliding frame, wherein a latching member of the sliding frame is movably coupled to the connecting section of the box for connecting the box and the sliding frame together.

II. Description of the Prior Art

Please refer to FIG. 1 for a traditional computer casing, comprising a casing 1 substantially in a cubic shape, an accommodating space 12 in the casing 1, an electronic component installed in the accommodating space 12 for the operation of a computer system, and an opening 10 disposed on one side of the casing 1 for installing the electronic component into the accommodating space 12, and the installation and operation are performed through the opening 10.

Further, a lid 2 is disposed on the casing 1 for precisely covering the opening 10, such that the casing 1 forms a closed space to prevent dust or foreign substances from entering the accommodating space 12. The lid 2 comprises a bent section 20 on at least one side, and the bent section 20 and the lid 2 are connected perpendicularly to each other, such that when the lid 2 is covered on the opening 10, the bent section 20 attaches precisely on the casing 1. At least one screw hole 22 is disposed respectively at the corresponding position on the bent section 20 and the casing 1, so that a user may use a tool to install a plurality of screws 3 into the screw holes 22 between the bent section 20 and the casing 1 to connect the lid 2 and the casing 1.

However, it requires a tool to remove the screws 3 from the lid 2 each time before removing the lid 2 from the casing 1 in order to expose the opening 10 for installing new electronic components into the accommodating space 12, or removing electronic components from the accommodating space 12, or directly repairing the electronic component inside. If the user does not have a tool handy, the lid 2 cannot be removed from the casing 1, and thus the user is unable to install, remove, or repair electronic components through the opening 10. Further, if the screw 3 is removed and installed very frequently, the teeth of the screw 3 will be worn out and the installation cannot be done. This arrangement causes trouble and inconvenience for the application.

SUMMARY OF THE INVENTION

In view of the conventional way of using screws to connect the lid and the casing of a computer, which causes inconvenience on installation, uninstallation, and maintenance, the inventor of this invention based on years of experience on the manufacture of related products to conduct extensive researches and experiments and finally invented a drawer-type computer casing in accordance with this invention.

The primary object of the invention is to provide a drawer-type computer casing, comprising a box and a sliding frame, wherein the box comprises an opening on one side, a connecting section disposed respectively on both corresponding sides of the opening, and an accommodating space in the box. The sliding frame can be accommodated in the accommodating space, and a latching member is movably coupled to on an end surface of the box at the position corresponding to the connecting section, such that when the sliding frame is installed into the accommodating space, the latching member will be set precisely on the corresponding position of the connecting section. Therefore, the latching member can be moved into the connecting section to connect the box and the sliding frame. Such arrangement provides a convenient way for installation and uninstallation without using screws to connect the box and the sliding frame.

BRIEF DESCRIPTION OF THE DRAWINGS

The accomplishment of the above-mentioned object of the present invention will become apparent from the following description and its accompanying drawings which disclose illustrative an embodiment of the present invention, and are as follows.

DESCRIPTION OF THE PREFERRED EMBODIMENT

Figure 1:
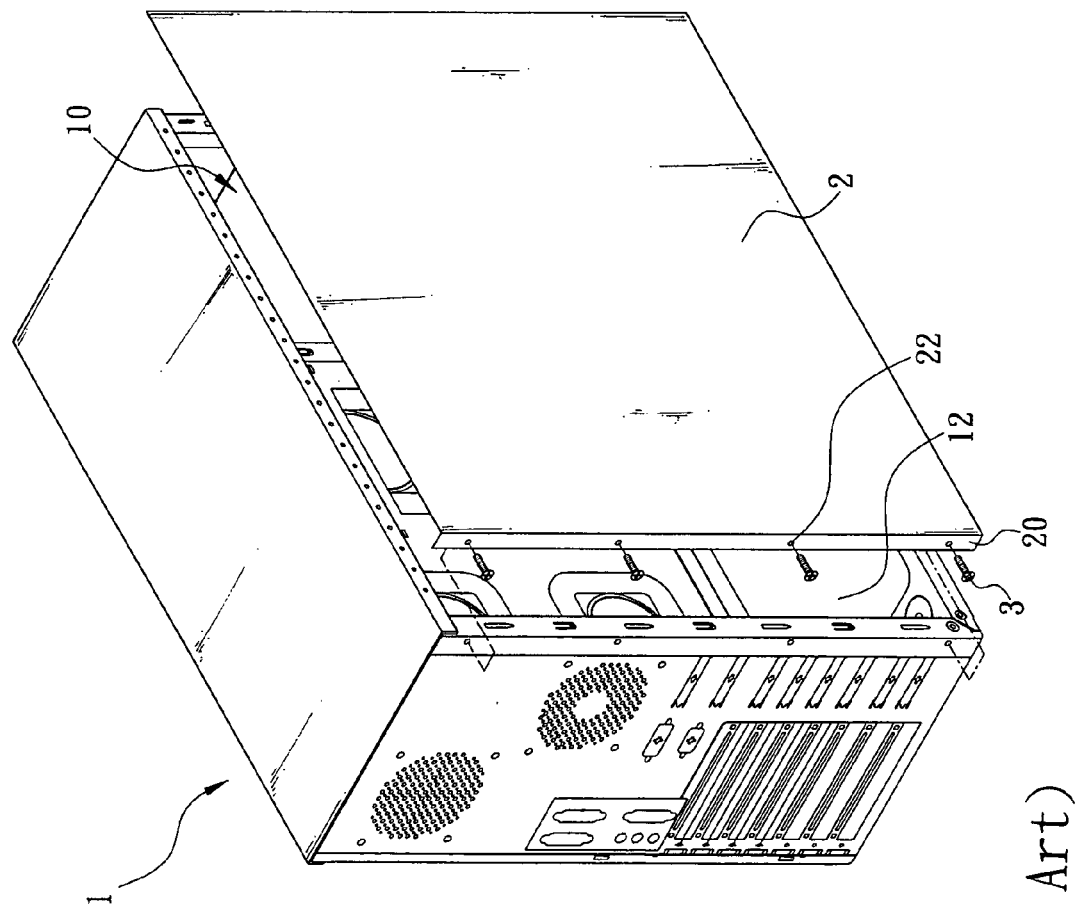
FIG. 1 is an illustrative diagram of the external appearance of a prior-art computer system.
Figure 2:
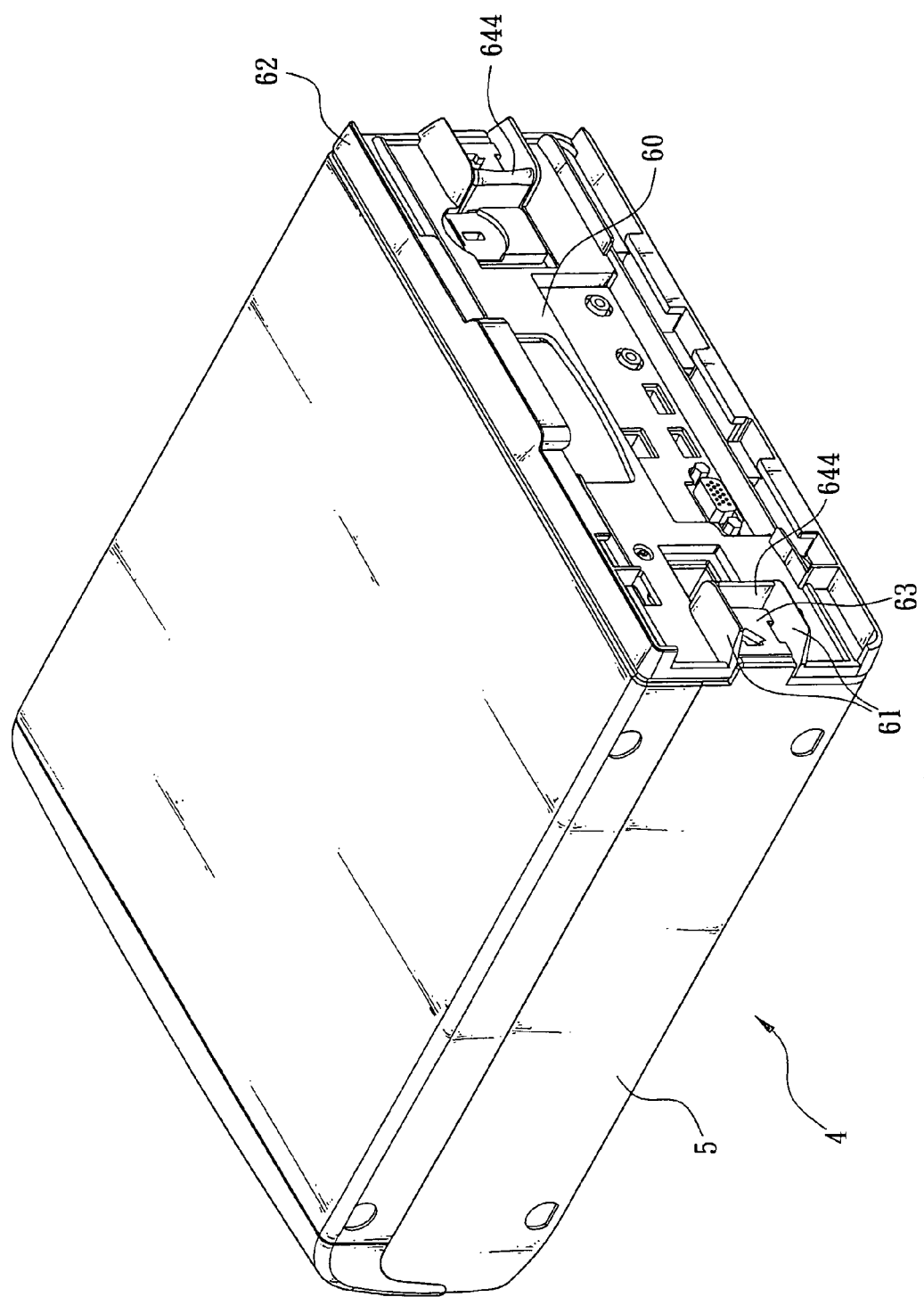
FIG. 2 is an illustrative diagram of the external appearance of the present invention.

Please refer to FIGS. 2 to 5 for the drawer-type computer casing of the present invention. The casing 4 of this invention comprises a box 5 and a sliding frame 6, wherein the box 5 comprises an opening 50 on one side, a connecting section 52 disposed respectively on both corresponding sides of the opening 50, and an accommodating space 54 in the box 5. The sliding frame 6 is accommodated in the accommodating space 54; a pulling handle 62 is disposed on an end surface 60; and a latching member 64 is movably coupled to on the edge of the end surface 60 proximate the connecting section 52, such that when the sliding frame 6 is pushed as if it were a drawer into the accommodating space 54, the latching member 64 will be set precisely on the corresponding position of the connecting section 52. Then, the latching member 64 can be moved into the connecting section 52 to connect the box 5 and the sliding frame 6.

Figure 3:
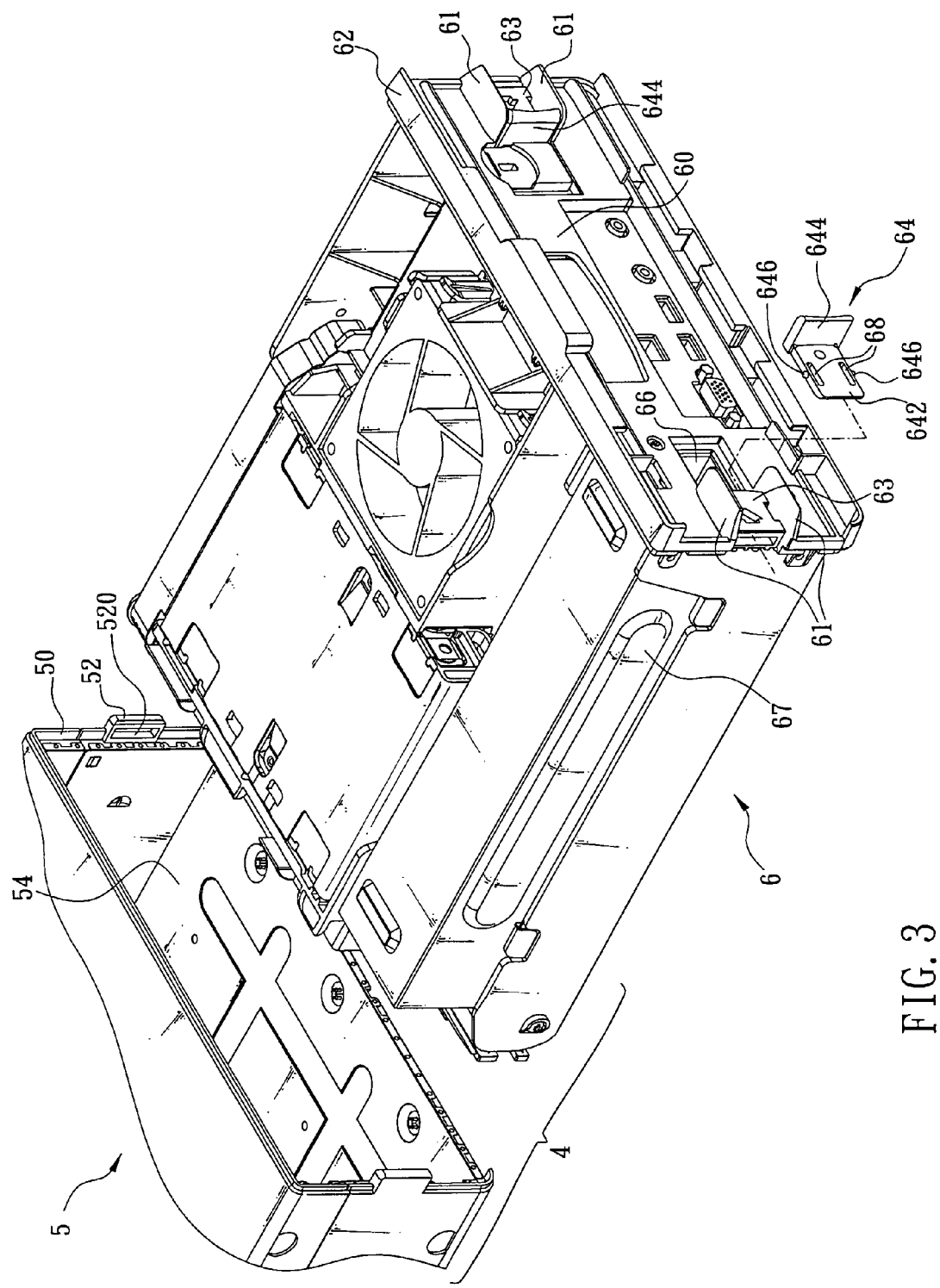
FIG. 3 is an illustrative diagram of the disassembled parts of the structure of the present invention.
Figure 4:
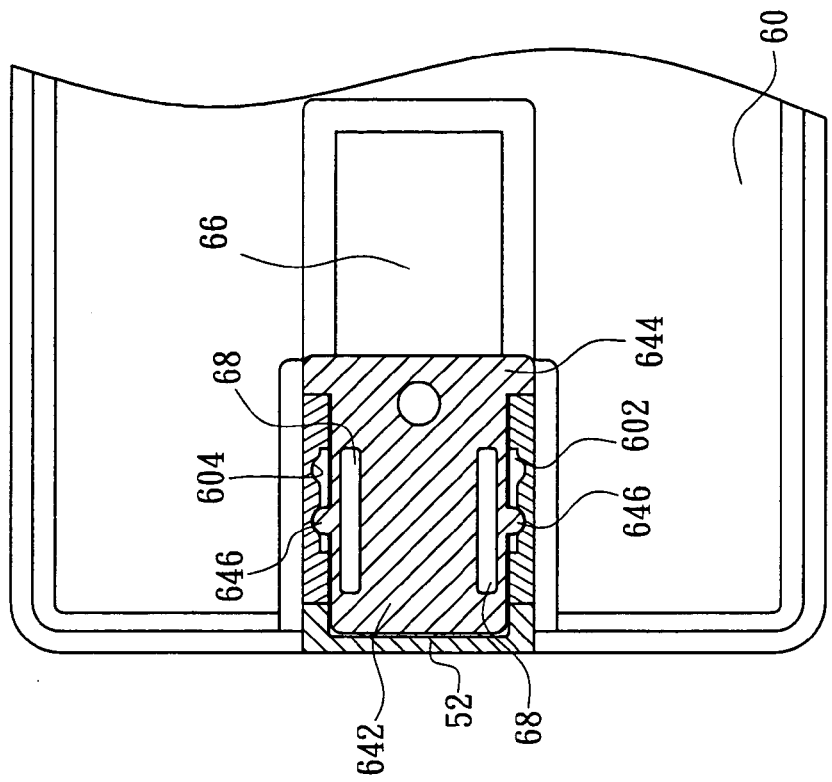
FIG. 4 is an illustrative diagram of the latching member being detached from the connecting section according to the present invention.
Figure 5:
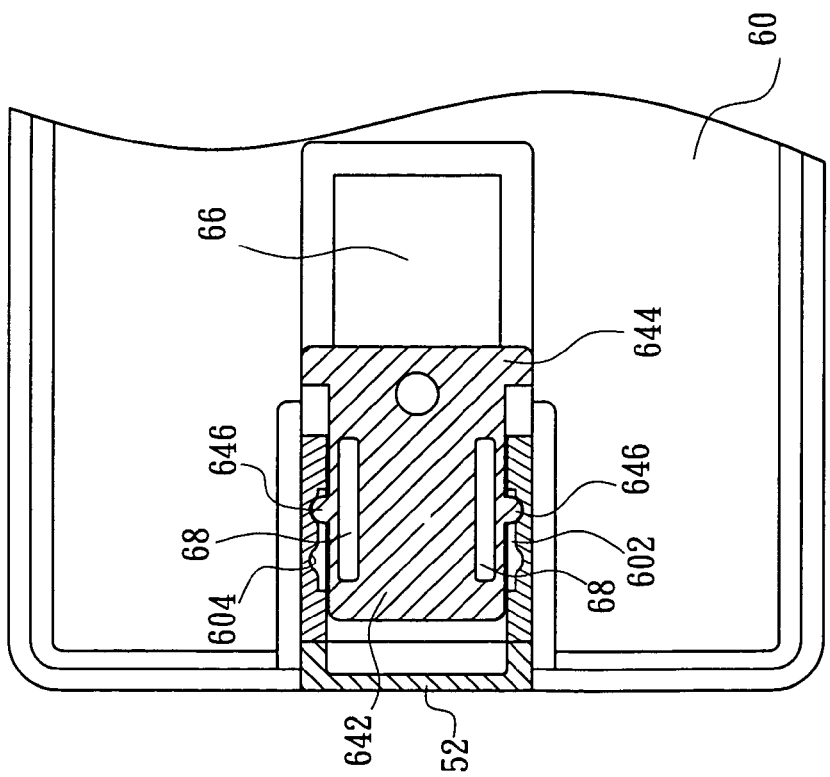
FIG. 5 is an illustrative diagram of the latching member being extended into the connecting section according to the present invention.

Please refer to FIGS. 3 to 5 for a preferred embodiment of this invention. The latching member 64 further comprises a horizontal section 642 and a vertical section 644, wherein the horizontal section 642 is attached onto the end surface 60, and a protruded pillar 646 is disposed individually on both sides of the connecting section 52. A sliding track 602 is disposed individually on the positions where the end surface 60 and the protruded pillar 646 are in contact. These sliding tracks 602 are provided for sliding the protruded pillars 646 thereon and restricting the moving distance of the protruded pillars 646. The vertical section 644 is disposed at one end of the horizontal section 642 away from the connecting section 52 and is perpendicular to the horizontal section 642. By pushing the vertical section 644, the horizontal section 642 is driven and shifted such that the protruded pillar 646 moves along the sliding track 602 and further extends the latching member 64 into the connecting section 52. The sliding track 602 has a fixed groove 604 proximate both ends of the sliding track 602. By means of the protruding pillar 646 working together with the fixed groove 604, the latching member 64 will not collide at or detach from the connecting section 52 after the latching member 64 is extended into the connecting section 52. The latching member 64 is pushed away from the connecting section 52, and then it will not move arbitrarily.

Please refer to FIG. 3 for the preferred embodiment of this invention. The connecting section 52 has an accommodating space 54 on one side, and an opening 50 on the other side. Additionally, the connecting section 52 has a hole 520 at a position corresponding to the horizontal section 642, such that the hole 520 can precisely receive the horizontal section 642. After the horizontal section 642 is extended into the hole 520, the horizontal section 642 is restricted by the hole 520, so that the pulling handle 62 cannot be pushed or pulled, and thus preventing the sliding frame 6 from falling out from the box 5.

Please refer to FIGS. 3 to 5 for the preferred embodiment of this invention. The end surface 60 has a groove 66 disposed at a position corresponding to the latching member 64 for accommodating the horizontal section 642, such that the horizontal section 642 and the end surface 60 are at the level of the same height.

The sliding track 602 is disposed in the groove 66 adjacent to both inner edges of the vertical section 644. A bumper 61 is disposed individually on both sides of vertical section 644 adjacent to the groove 66 and the bumper 61 is extended outward to the level of the same height of the vertical section 644, such that the vertical section 644 will not be collided by accident, which may shift the horizontal section 642.

Therefore, the sliding frame 6 will not be separated from the box 5 when the vertical section 644 is collided by accidents.

In the preferred embodiment of this invention, a blocking panel 63 is disposed at the position between the bumpers 61 where the bumpers 61 are coupled to the groove 66. The blocking panel 63 has a sign or a textual description to indicating the moving direction, so that after the latching member 64 is installed into the groove 66, the blocking panel 63 limits and prevents the latching member 64 from falling out from the groove 66.

In addition, since the groove 66 and the horizontal section 642 have corresponding sizes, so that the horizontal section 642 can move in the groove 66, and pass through or leave the hole 520. However, the horizontal section 642 has a protruded pillar 646, such that the sum of the width of the horizontal section 642 and the size of the two protruded pillars 646 will be larger than the width of the groove 66. Therefore, it is uneasy to install the horizontal section 642 into the groove 66. To facilitate the installation of the horizontal section 642 into the groove 66, this embodiment comprises a rectangular hole 68 on the horizontal section 642 at the position proximate the protruded pillar 646, so that when the horizontal section 642 is installed into the groove 66, the protruded pillars 646 are pressed against the sidewall of the groove 66. By means of the space provided by the rectangular hole 68, the protruded pillars 646 are moved towards the rectangular hole 68 such that the horizontal section 642 is deformed to allow the horizontal section 642 and the protruded pillars 646 to be installed into the groove 66 and the sliding track 602 respectively.

Further, a track bar 67 is disposed on both sides of the sliding frame 6 adjacent to the end surface 60, and a track (not shown in the figure) having a shape and size corresponding to the track bar 67 is disposed on both sides corresponding to the opening 50 inside the box 5. After the sliding frame 6 has been pushed to a distance into the box 5, the track and track bar 67 will be engaged, which will make the process of pushing the sliding frame 6 into the box 5 easier and smoother.

By means of the foregoing components, the computer casing makes use of the latching member 64 and the connecting section 52 for the connection, so that the sliding frame 6 and the box 5 can be installed or uninstalled conveniently. The present invention can effectively overcome the shortcomings of the traditional computer casing that uses screws to connect the lid and the casing.

While the invention has been described by means of specific embodiments, numerous modifications and variations could be made thereto by those skilled in the art without departing from the scope and spirit of the invention set forth in the claims.

What is claimed is:

1. A drawer-type computer casing, comprising:
 a box, having an opening on one side, a connecting section disposed respectively on both corresponding sides of said opening, and an accommodating space in the box;
 a sliding frame, being accommodated in said accommodating space, with an end surface being exposed from said opening, and
 said end surface having a pulling handle disposed thereon and a latching member movably coupled to the edge of the end surface proximate the connecting section, such that upon said sliding frame being installed into said accommodating space, said latching member is set precisely on the corresponding position of said connecting section, and extends into said connecting section after said latching member is pushed;
 wherein said latching member comprises a horizontal section attached onto said end surface and having a protruded pillar on both sides of said connecting section;
 a vertical section disposed at one end of said connecting section away from said horizontal section and perpendicular to said horizontal section; and
 a sliding track disposed on the positions where said end surface and said protruded pillar are in contact for allowing said protruded pillar to slide thereon and restricting the moving distance of said protruded pillar.

2. The drawer-type computer casing of claim 1, wherein said connecting section comprises an accommodating space on one side and an opening on the other side, and a hole disposed at a corresponding position on said horizontal section for letting said horizontal section pass through.

3. The drawer-type computer casing of claim 1, wherein said end surface comprises a groove at the position corresponding to said latching member for accommodating said horizontal section, such that said horizontal section and said end surface are at the same height, and said sliding track is disposed on both inner sides of said groove adjacent to said vertical section, and a bumper with a width substantially equal to said sliding track is disposed on both sides of said groove adjacent to said vertical section, so that said horizontal section is prevented from being pushed by said vertical section by accident.

4. The drawer-type computer casing of claim 1, wherein said sliding frame comprises a track bar on both sides of said end surface of said sliding frame, and a track with a shape and a size corresponding to said track bar is disposed on both sides of said opening in said box.

5. The drawer-type computer casing of claim 1, wherein said sliding track comprises a corresponding fixed groove disposed on both ends therein.

6. The drawer-type computer casing of claim 3 further comprising a blocking panel disposed on both sides of said groove adjacent to said vertical section, such that after said latching member is installed into said groove, said latching member is limited by said blocking panel.

7. The drawer-type computer casing of claim 3, wherein said horizontal section comprises a rectangular hole disposed on said horizontal section proximate to said protruded pillars.

* * * * *